US012542997B2

(12) United States Patent
An et al.

(10) Patent No.: US 12,542,997 B2
(45) Date of Patent: Feb. 3, 2026

(54) METHOD AND DEVICE FOR PROCESSING AUDIO DATA OBTAINED VIA MICROPHONE AND AUDIO DATA RECEIVED VIA EXTERNAL DEVICE INTO SINGLE AUDIO STREAM

(71) Applicant: SAMSUNG ELECTRONICS CO., LTD., Suwon-si (KR)

(72) Inventors: Hyunil An, Suwon-si (KR); Shinhyuck Kang, Suwon-si (KR); Dongmoon Ok, Suwon-si (KR); Injune Choi, Suwon-si (KR); Minjung Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 153 days.

(21) Appl. No.: 18/138,461

(22) Filed: Apr. 24, 2023

(65) Prior Publication Data

US 2023/0262387 A1 Aug. 17, 2023

Related U.S. Application Data

(63) Continuation of application No. PCT/KR2021/013713, filed on Oct. 6, 2021.

(30) Foreign Application Priority Data

Oct. 30, 2020 (KR) ........................ 10-2020-0143788

(51) Int. Cl.
*H04R 3/00* (2006.01)
*G10K 11/178* (2006.01)

(52) U.S. Cl.
CPC ......... *H04R 3/005* (2013.01); *G10K 11/1781* (2018.01); *H04R 2420/07* (2013.01)

(58) Field of Classification Search
CPC . H04R 3/005; H04R 2420/07; G10K 11/1781
See application file for complete search history.

(56) References Cited

U.S. PATENT DOCUMENTS 8,135,115 B1 3/2012 Hogg, Jr. et al.
8,204,239 B2 6/2012 Shimura et al.
(Continued)

FOREIGN PATENT DOCUMENTS

GB 2491264 A 11/2012
JP 2003-316382 A 11/2003
(Continued)

OTHER PUBLICATIONS

International Search Report (PCT/ISA/210) issued by the International Searching Authority on Jan. 19, 2022 in International Application No. PCT/KR2021/013713.
(Continued)

*Primary Examiner* — Joseph Saunders, Jr.
(74) *Attorney, Agent, or Firm* — Sughrue Mion, PLLC

(57) ABSTRACT

An electronic device includes: at least one microphone; a main processing circuit; and an audio processing circuit, wherein the main processing circuit is configured to: obtain, via the at least one microphone, first audio data including a first number of audio channels, the first number being greater than or equal to one; receive second audio data including a second number of audio channels from an external device connected to the electronic device, the second number being greater than or equal to one; and provide the first audio data and the second audio data to the audio processing circuit, and wherein the audio processing circuit is configured to: produce a single audio stream including a third number of audio channels by using the first number of audio channels of the first audio data and the second number of audio channels of the second audio data;
(Continued)

and provide the single audio stream to the main processing circuit.

15 Claims, 7 Drawing Sheets

(56) References Cited

U.S. PATENT DOCUMENTS

| | | | | |
|---|---|---|---|---|
| 10,152,977 | B2 | 12/2018 | Atti et al. | |
| 10,403,253 | B2 | 9/2019 | Adachi et al. | |
| 10,552,113 | B2 | 2/2020 | Lee et al. | |
| 10,582,288 | B2 | 3/2020 | Kirsch et al. | |
| 10,893,088 | B2 | 1/2021 | Bhaya et al. | |
| 11,276,417 | B2 | 3/2022 | Moravy et al. | |
| 2013/0226593 | A1 | 8/2013 | Magnusson et al. | |
| 2015/0054943 | A1 | 2/2015 | Zad Issa et al. | |
| 2015/0334246 | A1 | 11/2015 | Bonarius et al. | |
| 2018/0350405 | A1 | 12/2018 | Marco et al. | |
| 2019/0116418 | A1* | 4/2019 | Teo | H04R 3/005 |
| 2019/0306320 | A1 | 10/2019 | Sugioka | |

FOREIGN PATENT DOCUMENTS

| | | | |
|---|---|---|---|
| JP | 2016-504877 | A | 2/2016 |
| JP | 6040802 | B2 | 12/2016 |
| JP | 2019-176404 | A | 10/2019 |
| JP | 2021-527366 | A | 10/2021 |
| JP | 2022-42234 | A | 3/2022 |
| KR | 10-2004-0060711 | A | 7/2004 |
| KR | 10-1549090 | B1 | 9/2015 |
| KR | 10-2018-0025084 | A | 3/2018 |
| KR | 10-2019-0113374 | A | 10/2019 |
| KR | 10-2082393 | B1 | 2/2020 |
| KR | 10-2020-0034166 | A | 3/2020 |
| KR | 10-2175602 | B1 | 11/2020 |
| KR | 10-2327616 | B1 | 11/2021 |
| KR | 10-2331233 | B1 | 11/2021 |

OTHER PUBLICATIONS

Written Opinion (PCT/ISA/237) issued by the International Searching Authority on Jan. 19, 2022 in International Application No. PCT/KR2021/013713.

Communication dated Jan. 26, 2024, issued by the European Patent Office in European Application No. 21886603.6.

Communication dated Feb. 26, 2025, issued by the European Patent Office in European Application No. 21886603.6.

Communication dated Nov. 14, 2025, issued by the European Patent Office in European Application No. 21886603.6.

* cited by examiner

METHOD AND DEVICE FOR PROCESSING AUDIO DATA OBTAINED VIA MICROPHONE AND AUDIO DATA RECEIVED VIA EXTERNAL DEVICE INTO SINGLE AUDIO STREAM

CROSS-REFERENCE TO RELATED APPLICATIONS

This application is a by-pass continuation application of International Application No. PCT/KR2021/013713, filed on Oct. 6, 2021, which is based on and claims priority to Korean Patent Application No. 10-2020-0143788, filed on Oct. 30, 2020, in the Korean Intellectual Property Office, the disclosures of which are incorporated by reference herein their entireties.

BACKGROUND

1. Field

The disclosure relates to audio data processing and, more particularly, to a method and a device for processing audio data received from an external audio device connected in a wired or wireless manner and audio data that obtained via a microphone built in an electronic device.

2. Description of Related Art

An electronic device (e.g., a smartphone) may process audio data obtained using a plurality of microphones built in the electronic device and audio data that is received from an external audio device connected to the electronic device in a wired or wireless manner. For example, a smartphone may perform audio work (e.g., voice recording or video recording) by using (i) audio data obtained via a plurality of microphones built in the smartphone and (ii) audio data received via wireless earphones connected to the smartphone.

An electronic device may select and process one piece of audio data among audio data having a plurality of channels obtained via a plurality of microphones included in the electronic device and audio data received from an external device, and may be incapable of using audio data that is not selected. For example, due to a restriction associated with a platform using only a single audio stream, audio data received from the plurality of microphones (an audio device built in the electronic device and an external audio device connected, e.g., via Bluetooth) may not be processed into a single audio stream. Therefore, the electronic device may produce and process two separate audio streams corresponding to two different audio data from those two different audio devices.

In a case that a number of audio channels included in audio data selected by the electronic device is less than a number of audio channels designated in an audio interface, there has been an interest about using unselected audio data via an audio channel that is empty among the designated audio channels.

SUMMARY

Various embodiments disclosed in the disclosure provide a method and a device for processing audio data obtained via a microphone and audio data received via an external device into a single audio stream.

According to an aspect of the disclosure, an electronic device includes: at least one microphone; a main processing circuit; and an audio processing circuit, wherein the main processing circuit is configured to: obtain, via the at least one microphone, first audio data including a first number of audio channels, the first number being greater than or equal to one; receive second audio data including a second number of audio channels from an external device connected to the electronic device, the second number being greater than or equal to one; and provide the first audio data and the second audio data to the audio processing circuit, and wherein the audio processing circuit is configured to: produce a single audio stream including a third number of audio channels by using the first number of audio channels of the first audio data and the second number of audio channels of the second audio data; and provide the single audio stream to the main processing circuit.

The electronic device may further include a wireless communication circuit configured to support short-range wireless communication, and the main processing circuit may be further configured to receive the second audio data from the external device via the wireless communication circuit.

The wireless communication may yb Bluetooth communication.

The electronic device may further include a wired interface, and the main processing circuit may be further configured to: connect to the external device in a wired manner via the wired interface; and receive the second audio data from the external device.

The external device may include wired earphones or wireless earphones.

The main processing circuit may include the audio processing circuit as a first processing block, and the audio processing circuit may be further configured to provide the single audio stream to a second processing block of the main processing circuit.

The electronic device may further include (i) a first number of buffers corresponding to the first number of audio channels of the first audio data and (ii) a second number of buffers corresponding to the second number of audio channels of the second audio data.

The main processing circuit may be further configured to: measure an intensity of a signal corresponding to the second audio data received from the external device connected to the electronic device; and provide information corresponding to the measured intensity of the signal to the audio processing circuit.

The audio processing circuit may be further configured to, based on the measured intensity of the signal being less than or equal to a reference value, perform pre-processing on the second audio data by a buffer.

The pre-processing may include converting the second audio data based on a parameter related to a gain or a latency.

The audio processing circuit may be further configured to produce the single audio stream by combining the first number of audio channels of the first audio data and the second number of audio channels of the second audio data.

The audio processing circuit may be further configured to produce the single audio stream by combining the first number of audio channels of the first audio data and the second number of audio channels of the second audio data that is converted via pre-processing.

The audio processing circuit may be further configured to produce the single audio stream by combining, based on at least one of (i) the third number of audio channels or a sampling rate, (ii) the first number of audio channels of the first audio data, and (iii) the second number of audio channels of the second audio data.

The audio processing circuit may be further configured to perform post-processing on the produced single audio stream.

The post-processing may include noise cancellation or sound quality correction.

According to an aspect of the disclosure, an operation method performed by an electronic device, includes: obtaining, via at least one microphone of the audio processing device, first audio data including a first number of audio channels, the first number being greater than or equal to one; receiving second audio data including a second number of audio channels from an external device connected to the electronic device, the second number being greater than or equal to one; providing the first audio data and the second audio data to an audio processing circuit of the audio processing device; producing a single audio stream having a third number of audio channels by using the first number of audio channels of the first audio data and the second number of audio channels of the second audio data via the audio processing circuit; and providing the single audio stream to a main processing circuit.

The operation method may further include: measuring an intensity of a signal corresponding to the second audio data received from the external device; and providing information corresponding to the measured intensity of the signal to the audio processing circuit.

The operation method may further include performing, based on the measured intensity of the signal being less than or equal to a reference value, pre-processing on the second audio data by using a buffer.

The operation method may further include producing the single audio stream by combining the first number of audio channels of the first audio data and the second number of audio channels of the second audio data.

The operation method may further include performing post-processing on the produced signal audio stream, wherein the post-processing may include noise cancellation or sound quality correction.

According to one or more embodiments of the disclosure, an electronic device may process, into a single audio stream, audio data obtained via a microphone and audio data received via an external device. For example, the electronic device may produce, via an audio processing circuit, a single audio stream with audio data obtained via a microphone and audio data received via an external device, and may perform voice recording, video recording, or the like using the same. In addition, various effects directly or indirectly recognized from the disclosure may be provided.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
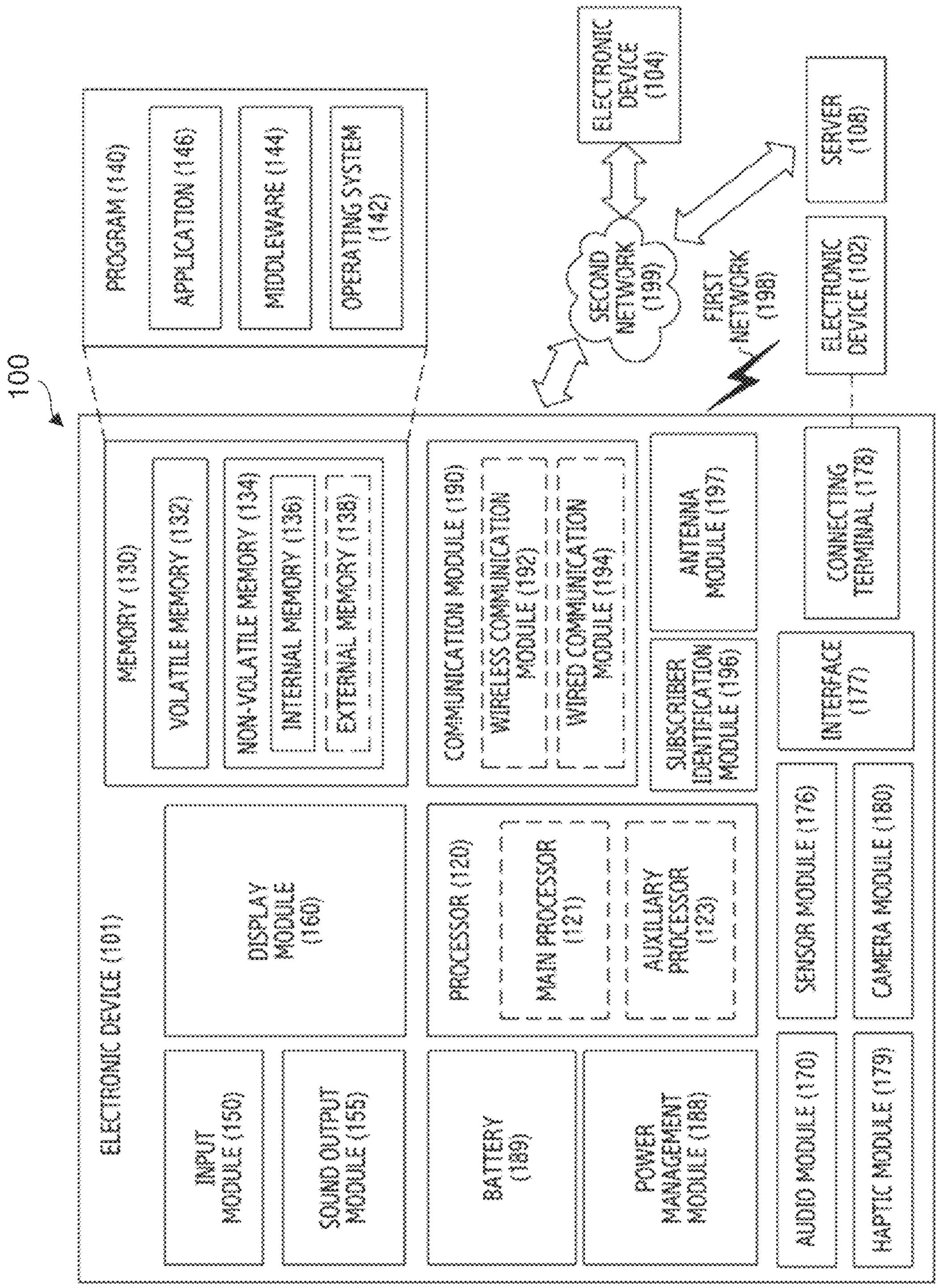
FIG. 1 illustrates an electronic device in a network environment according to an embodiment.

Hereinafter, one or more embodiments are described with reference to attached drawings. However, this is not to limit the disclosure to a predetermined embodiment, and it should be construed that various modifications, equivalents, and/or alternatives of the embodiment of the disclosure are included. In the drawings, identical or like reference numerals denote identical or like elements.

FIG. 1 is a block diagram illustrating an electronic device 101 in a network environment 100 according to one or more embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one or more embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
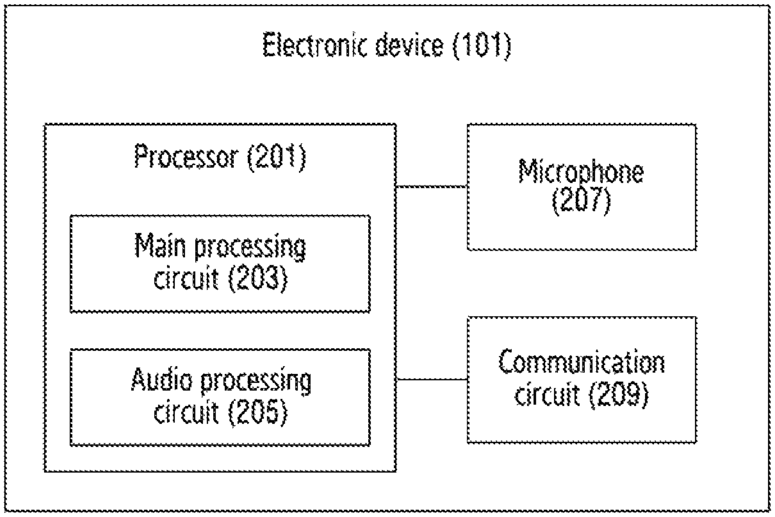
FIG. 2 illustrates an electronic device according to an embodiment.

FIG. 2 is a block diagram illustrating the electronic device 101 according to an embodiment.

Referring to FIG. 2, the electronic device 101 may include a processor 201, a main processing circuit 203, an audio processing circuit 205, a microphone 207, and a communication circuit 209. A module included in the electronic device 101 may be understood as a hardware module (e.g., a circuit). The component elements included in the electronic device 101 may not be limited to the component elements (e.g., the processor 201, the main processing circuit 203, the audio processing circuit 205, the microphone 207, and communication circuit 209) illustrated in FIG. 2. The component elements of the electronic device 101 of FIG. 2 may be replaced with other component elements, or additional component elements may be added to the electronic device 101. For example, at least a part of the component elements of the electronic device 101 in FIG. 1 may be applicable to the electronic device 101 of FIG. 2. As another example, the electronic device 101 of FIG. 2 may include a wired interface, a display, a memory, and a speaker.

The processor 201 may implement instructions or an instruction stored in a memory and may control operations of the component elements (e.g., the main processing circuit 203, the audio processing circuit 205, the microphone 207, and the communication circuit 209) of the electronic device 101. The processor 201 may include the main processing circuit 203 and the audio processing circuit 205, and may be electrically and/or operatively connected to the microphone 207 and the communication circuit 209. The processor 201 may execute software so as to control at least one other component elements (e.g., the microphone 207, communication circuit 209) connected to the processor 201. The processor 201 may obtain a command from the component elements included in the electronic device 101, may interpret the obtained command, and may process various data and/or perform an operation according to the interpreted command.

According to an embodiment, the main processor (e.g., the main processing circuit 203, which may be an application processor) and a sub-processor (e.g., the audio processing circuit 205) may be embodied separately as illustrated in FIG. 2. The method of embodying the main processor and the sub-processor is not limited to FIG. 2, and the main processor (e.g., an application processor) may include the sub-processor (e.g., the audio processing circuit 205). For example, the main processing circuit 203 may include the audio processing circuit 205 as a first processing block. The application processor may be a system on chip.

The audio processing circuit 205 may perform various processes on audio data (e.g., first audio data, second audio data) provided from the main processing circuit 203. For example, the audio processing circuit 205 may apply various sound effects to audio data. The audio processing circuit 205 may perform various operations for outputting sound corresponding audio data via an output device (e.g., a speaker). The first audio data is audio data obtained via the microphone 207 included in the electronic device 101, and the second audio data is audio data received from an external device connected to the electronic device 101 (via short-range wireless communication or a wired interface).

The microphone 207 may obtain sound. For example, the microphone 207 may obtain user voice or sound produced from surroundings. The microphone 207 may obtain audio data corresponding to sound. For example, the electronic device 101 may obtain sound data corresponding to user voice via the microphone 207. The electronic device 101 may include at least one microphone 207. For example, the electronic device 101 may include a plurality of microphones 207. The electronic device 101 may obtain sound via the plurality of microphones 207.

The communication circuit 209 may support communication performed between the electronic device 101 (e.g., a smartphone) and an external device (e.g., wireless earphones, wired earphones) using wired communication or wireless communication (e.g., Bluetooth (BT), Bluetooth low energy (BLE), Wi-Fi). For example, the electronic device 101 may perform transmission or reception of audio data with wireless earphones via the communication circuit 209 that supports short-range wireless communication. As another example, the electronic device 101 may perform transmission or reception of audio data with wired earphones via the communication circuit 209 (e.g., a wired interface) that supports wired communication.

Figure 3:
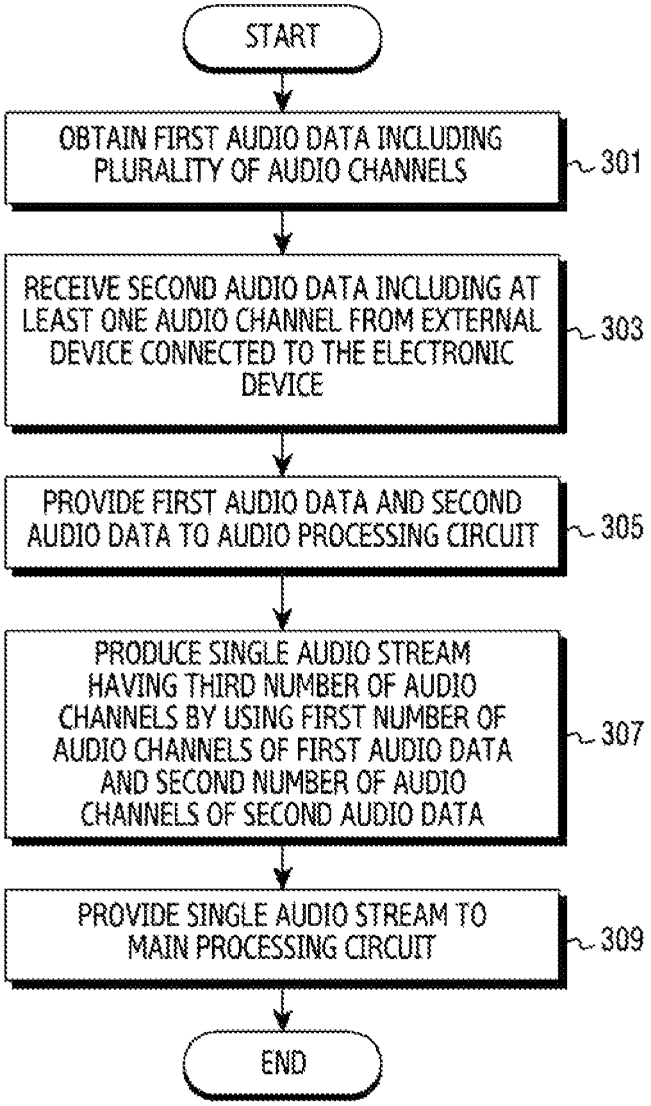
FIG. 3 illustrates an operation of producing a single audio stream by an electronic device according to an embodiment.

FIG. 3 is a flowchart of an operation of producing a single audio stream by the electronic device 101 according to an embodiment.

A series of operations described hereinafter may be performed by the electronic device 101 in parallel or in a different order, and some operations may be omitted or added.

In operation 301, the electronic device 101 may obtain first audio data including a plurality of audio channels. The electronic device 101 may obtain the first audio data including a plurality of audio channels via the microphone 207. For example, the electronic device 101 may obtain the first audio data including three audio channels via three microphones 207. Audio data obtained via the single microphone 207 may be understood as a single audio channel. The first audio data may be audio data obtained via the microphone 207 included in the electronic device 101.

In operation 303, second audio data including at least one audio channel may be received from an external device connected to the electronic device 101. For example, the electronic device 101 may receive the second audio data including at least one audio channel from an external device connected via wired communication or wireless communication. For example, the electronic device 101 (e.g., a smartphone) may receive the second audio data including at least one audio channel from an external device (e.g., wired earphones) connected via a wired cable. As another example, the electronic device 101 (e.g., a smartphone) may receive the second audio data including at least one audio channel from an external device (e.g., wireless earphones) connected via short-range communication. The second audio data may be audio data received from an external device connected to the electronic device 101 via the communication circuit 209.

In operation 305, the electronic device 101 may provide first audio data and second audio data to the audio processing circuit 205. For example, the main processing circuit 203 of the electronic device 101 may provide the first audio data and the second audio data to the audio processing circuit 205 (e.g., a digital signal processing or a digital signal processor (DSP)) in order to perform a mixing the first audio data and the second audio data.

In operation 307, the electronic device 101 may produce a single audio stream having a third (a designated number) of audio channels by using a first number of (the plurality of) audio channels of the first audio data and a second number of (the at least one) audio channel of the second audio data. For example, the audio processing circuit 205 (e.g., a DSP) may produce a single audio stream having four audio channels using three audio channels of the first audio data and a single audio channel of the second audio data. In other embodiments, the first audio data and the second audio channel can have other numbers of audio channels, respectively. For example, the first audio data has four (4) audio channels and the second audio data has three (3) audio channels.

The audio processing circuit 205 may determine signals of effective audio channels among the plurality of audio channels included in the first audio data and the second audio data. The audio processing circuit 205 may produce a single audio stream using the determined signals of the effective channels. The designated number of audio channels may be various depending on an audio interface. For example, the designated number of the audio channels may be four audio channels.

According to an embodiment, the electronic device 101 may perform a mixing of the first audio data obtained via the microphone 207 and the second audio data received from the external device, so as to have a designated number of audio channels. For example, the mixing is to change the audio data so that the number of the plurality of audio channels is the designated number of audio channels. The external device may be connected to the electronic device 101 in wired communication or wireless communication. The electronic device 101 may produce a single audio stream by mixing the first audio data obtained via the microphone 207 and the second audio data received from the external device (e.g., wired earphones or wireless earphones) connected in a wired or wireless manner.

In operation 309, the electronic device 101 may provide the single audio stream to the main processing circuit 203. The electronic device 101 may provide the single audio stream produced by the audio processing circuit 205 to the main processing circuit 203. For example, the electronic device 101 may provide the single audio stream produced by the audio processing circuit 205 (e.g., a DSP) to a higher layer (e.g., an audio hardware abstraction layer (audio HAL)) via a pulse code modulation (PCM) node.

Figure 4:
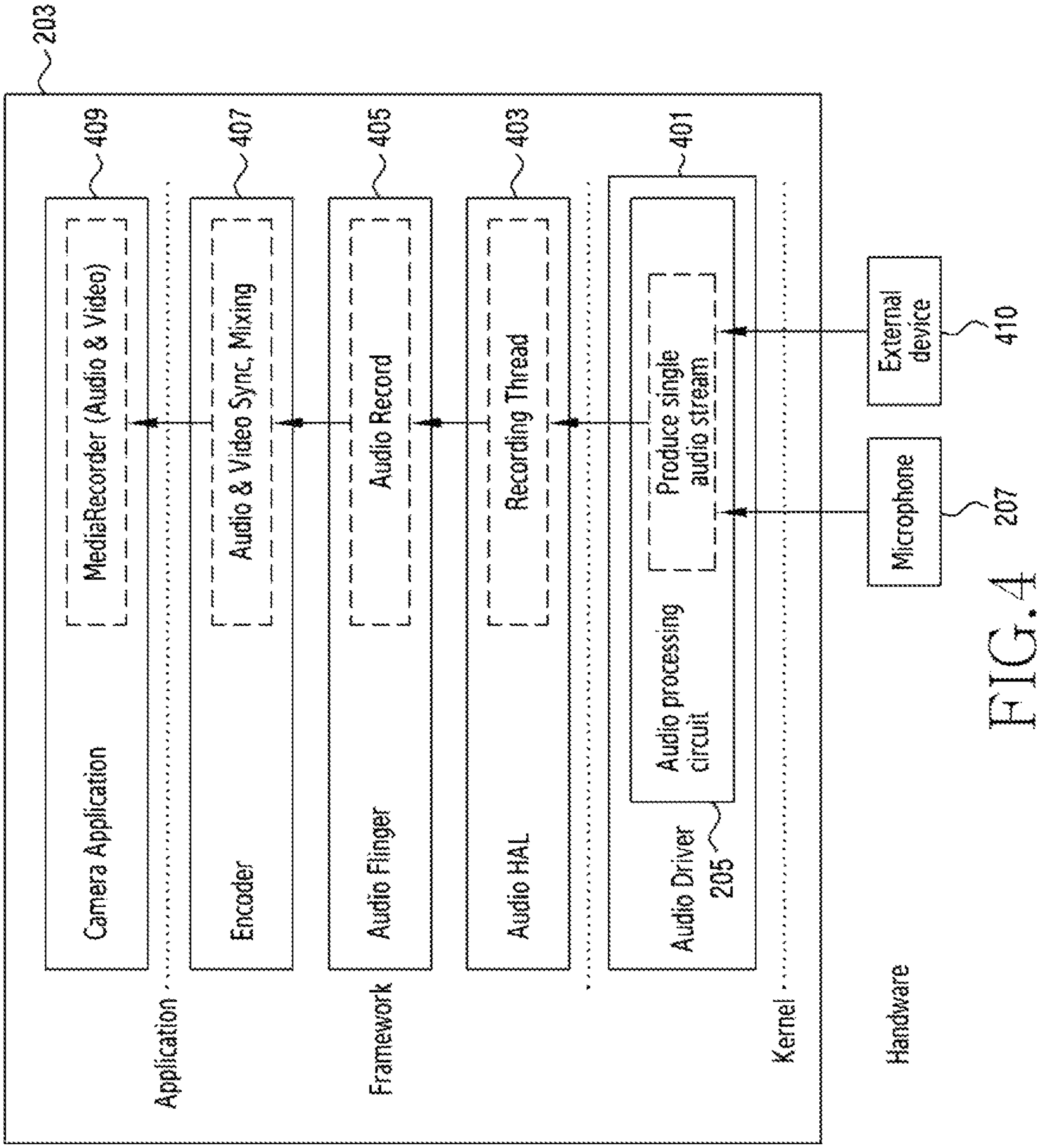
FIG. 4 illustrates software for producing a single audio stream according to an embodiment.

FIG. 4 is a diagram illustrating hardware and software for producing a single audio stream in the electronic device 101 according to an embodiment.

Referring to FIG. 4, the electronic device 101 may include hardware (e.g., the microphone 207, an external device 410) for obtaining first audio data including a plurality of audio channels and second audio data including at least one audio channel. The electronic device 101 may process the first audio data and the second audio data by using software so as to mix them into a single audio stream.

According to an embodiment, the electronic device 101 may obtain the first audio data including a plurality of audio channels via the microphone 207, and may receive the second audio data including at least one audio channel from the external device 410 connected via communication. The electronic device 101 may provide the first audio data and the second audio data to the audio processing circuit 205. An audio driver 401 and the audio processing circuit 205 may control an audio device, and may transfer configuration information related to the audio device to the electronic device 101. The audio processing circuit 205 of the audio driver 401 may produce a single audio stream by using the first audio data and the second audio data. The audio driver 401 may provide the produced single audio stream to the audio hardware abstraction layer (audio HAL) 403, which may periodically receive voice input data (e.g., first audio data, second audio data) from the audio driver 401 via a recording thread. An audio flinger 405 may produce an audio record instance, and may record the single audio stream provided from the audio HAL 403. An encoder 407 may combine voice input data (e.g., first audio data, second audio data) and video input data so as to produce video data, and may provide the produced video data to an application (e.g., a camera application 409). The camera application 409 may perform functions related to recording a video.

Figure 5:
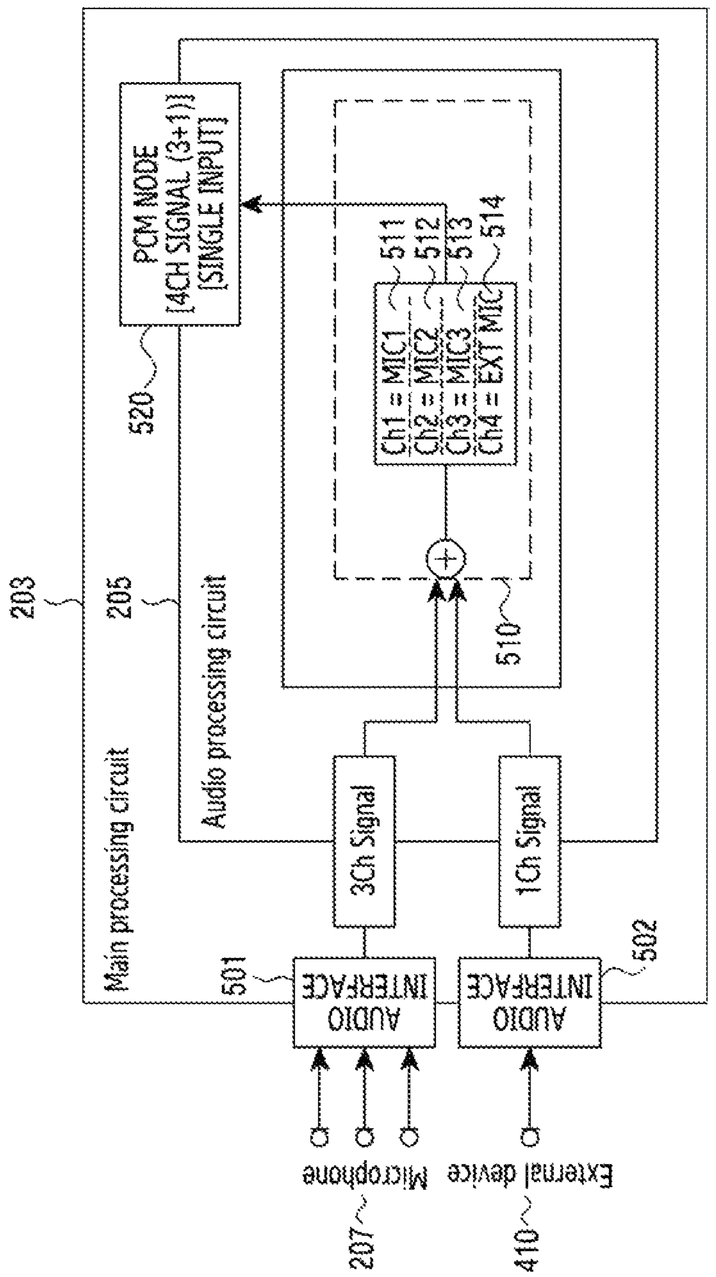
FIG. 5 illustrates an operation of producing a single audio stream via an audio processing circuit by an electronic device according to an embodiment.

FIG. 5 is a schematic diagram illustrating an operation of producing a single audio stream via the audio processing circuit 205, by the electronic device 101 according to an embodiment.

Referring to FIG. 5, the electronic device 101 may obtain first audio data including a plurality of audio channels via the microphone 207. For example, the electronic device 101 may obtain the first audio data including three audio channels via the microphone 207. As another example, the electronic device 101 may obtain the first audio data including two audio channels via the microphone 207, and may process the same as a stereo input. The electronic device 101 may provide the first audio data to the audio processing circuit 205 via an audio interface 501. The audio interface 501 may configure an even number of channels. For example, the audio interface 501 illustrated in FIG. 4 may transfer the first audio data via four channels.

According to an embodiment, the electronic device 101 may receive second audio data including at least one audio channel from the external device 410 (e.g., wired earphones, wireless earphones) connected via wireless communication or wired communication. For example, the electronic device 101 may receive second audio data including a single audio channel from the external device 410 connected via short-range wireless communication (e.g., BT) or wired communication (e.g., a wired cable). An audio interface 502 may configure an even number of channels. For example, the audio interface 502 illustrated in FIG. 4 may transfer the second audio data via two channels (e.g., stereo). The electronic device 101 may provide the second audio data to the audio processing circuit 205 via the audio interface 502.

According to an embodiment, the audio processing circuit 205 may produce a single audio stream using the first audio data including a plurality of audio channels and the second audio data including at least one audio channel.

According to an embodiment, the audio processing circuit 205 may determine effective channels among the plurality of audio channels included in the first audio data and the at least one audio channel included in the second audio data. For example, the electronic device 101 may determine an effective channel (e.g., audio channel one (1) 511 corresponding to audio data obtained via MIC 1, audio channel two (2) 512 corresponding to audio data obtained via MIC 2, and audio channel three (3) 513 corresponding to audio data obtained via MIC 3) among the plurality of audio channels obtained via the microphone 207. As another example, the electronic device 101 may determine an effective channel (e.g., audio channel four (4) 514 corresponding to audio data obtained via an external microphone (EXT MIC)) among at least one audio channel received via the external device 410. The EXT MIC may be a microphone prepared in the external device 410.

According to an embodiment, the audio processing circuit 205 may produce a single audio stream using audio data corresponding to the determined effective channels 511, 512, 513, and 514. The audio processing circuit 205 may produce a single audio stream by combining the determined effective channels.

According to an embodiment, based on at least one of the number of a designated number of audio channels or a sampling rate, the audio processing circuit 205 may combine a plurality of audio channels of the first audio data and at least one audio channel of the second audio data, so as to produce a single audio stream.

According to an embodiment, the audio processing circuit 205 may provide the produced single audio stream to the audio HAL 403 via a PCM node 520. The single audio stream may include four channels, and may be processed as a single input.

Figure 6:
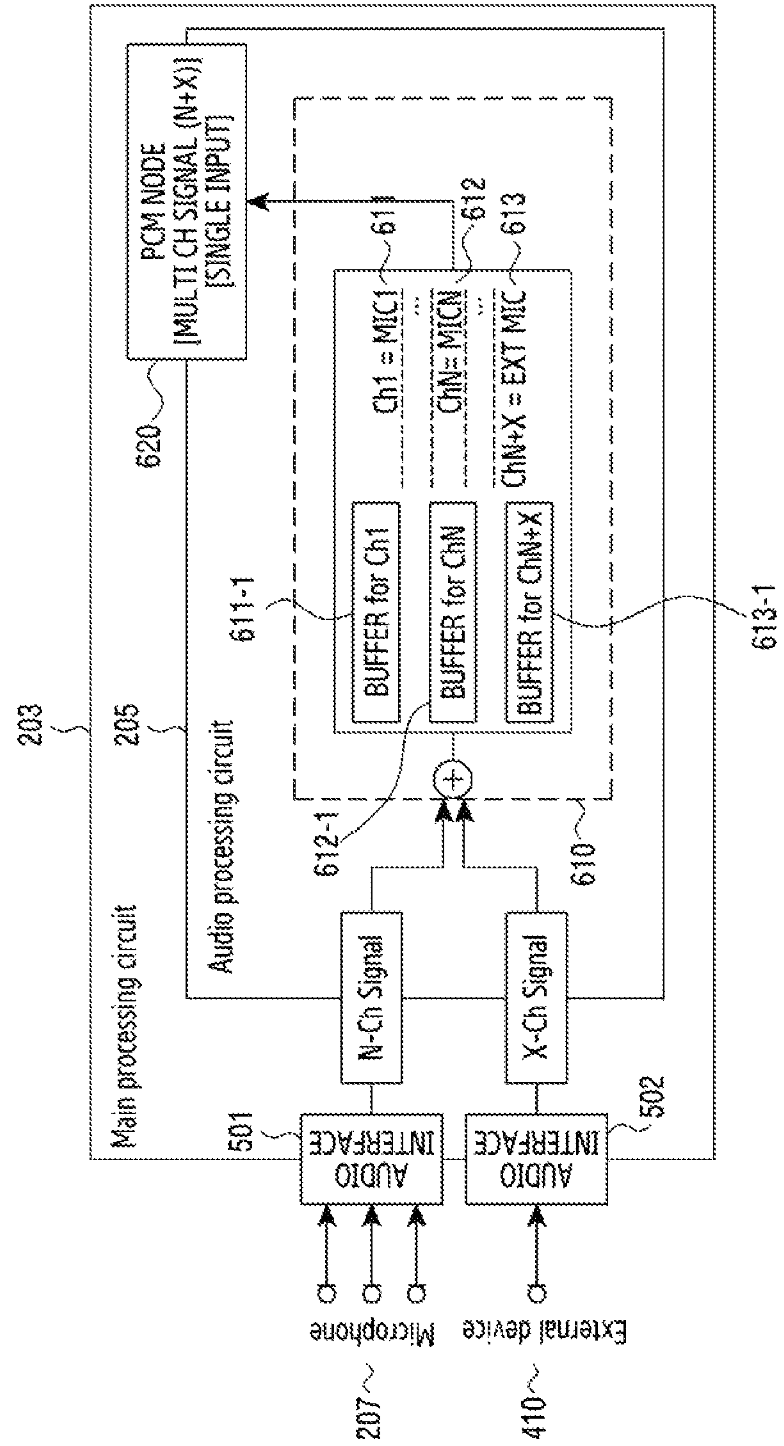
FIG. 6 illustrates an operation of producing a single audio stream using a buffer by an electronic device according to an embodiment.

FIG. 6 is a schematic diagram illustrating an operation of producing a single audio stream using a buffer by the electronic device 101 according to an embodiment.

Referring to FIG. 6, the electronic device 101 may obtain first audio data including a plurality of audio channels via the microphone 207. For example, the electronic device 101 may obtain the first audio data including N audio channels via the microphone 207. The electronic device 101 may provide the first audio data to the audio processing circuit 205 via the audio interface 501.

According to an embodiment, the electronic device 101 may receive second audio data including at least one audio channel from the external device 410 (e.g., wired earphones, wireless earphones) connected via wireless communication or wired communication. For example, the electronic device 101 may receive second audio data including X audio channels from the external device 410 connected via short-range wireless communication (e.g., BT) or wired communication (e.g., a wired cable). The electronic device 101 may provide the second audio data to the audio processing circuit 205 via the audio interface 502.

According to an embodiment, the audio processing circuit 205 may produce a single audio stream by using the first audio data including N audio channels and the second audio data including X audio channels.

According to an embodiment, the audio processing circuit 205 may determine effective channels among the N audio channels included in the first audio data and the X audio channels included in the second audio data. For example, the electronic device 101 may determine an effective channel (e.g., audio channel one (1) 611 corresponding to audio data obtained via MIC 1, audio channel N 612 corresponding to audio data obtained via MIC N) among the plurality of audio channels obtained via the microphone 207. As another example, the electronic device 101 may determine an effective channel (e.g., audio channel N+X 613 corresponding to audio data obtained via an EXT MIC) among at least one audio channel received via the external device 410. The EXT MIC may be a microphone prepared in the external device 410.

According to an embodiment, the electronic device 101 may produce a single audio stream using buffers 611-1, 612-1, and 613-1. A single buffer may correspond to a single audio channel. For example, the buffer 611-1, the buffer 612-1, and the buffer 613-1 may correspond to the audio channel one (1) 611, the audio channel N 612, and the audio channel N+X 613, respectively. Regarding the buffers 611-1, 612-1, and 613-1, the audio processing circuit 205 may process, using the buffers 611-1, 612-1, and 613-1, events that occur during an operation of processing the first audio data and the second audio data. For example, the audio processing circuit 205 may perform pre-processing or post-processing on events (e.g., a latency and a decrease in sound volume) related to the first audio data and the second audio data by using buffers 611-1, 612-1, and 613-1. Pre-processing or post-processing is described in detail with reference to FIG. 7.

According to an embodiment, the audio processing circuit 205 may provide the produced single audio stream to the audio HAL 403 via a PCM node 620. The single audio stream may include N+X channels, and may be processed as a single input.

Figure 7:
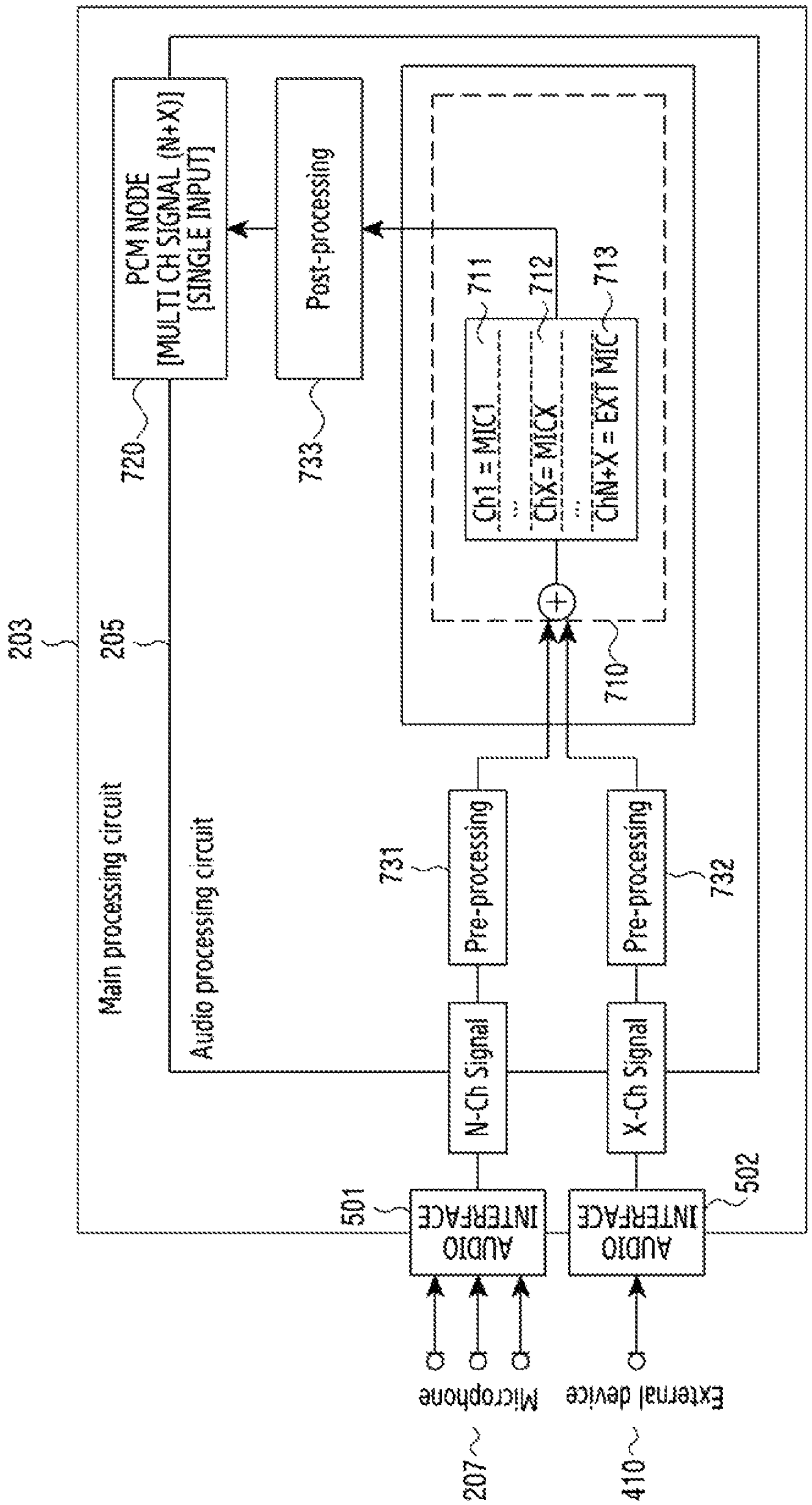
FIG. 7 illustrates an operation of producing, by an electronic device according to an embodiment, a single audio stream by performing pre/post-processing via an audio processing circuit.

FIG. 7 is a schematic diagram illustrating an operation of producing a single audio stream by performing pre-processing/post-processing via the audio processing circuit 205, by the electronic device 101 according to an embodiment.

Referring to FIG. 7, the audio processing circuit 205 of the electronic device 101 may produce a single audio stream via pre-processing 731 and 732 and post-processing 733. Hereinafter, a duplicated description of the description that has been described with reference to FIGS. 5 and 6 is omitted.

According to an embodiment, the electronic device 101 may measure the intensity of a signal corresponding to the second audio data received from the external device 410. Based on the measured intensity of the signal, the electronic device 101 may perform pre-processing 732 on the second audio data. For example, the electronic device 101 may provide information associated with the measured intensity of the signal to the audio processing circuit 205. In case that the measured intensity of the signal is less than or equal to a reference value, the electronic device 101 may perform pre-processing 732 on the second audio data by using a buffer (e.g., the buffer 613-1). For example, in case that the measured intensity of the signal is less than or equal to the reference value, the electronic device 101 may determine that the sound volume of the second audio data is decreased or a latency occurs. Based on the information associated with the measured signal, the audio processing circuit 205 may apply a parameter related to a gain or latency to the second audio data, so as to perform pre-processing 732. Pre-processing 731 and 732 may be conversion of the second audio data based on a parameter related to a gain or a latency.

According to an embodiment, the electronic device 101 may measure the intensity of a signal corresponding to first audio data obtained via the microphone 207. Based on the measured intensity of the signal, the electronic device 101 may perform pre-processing 731 on the first audio data. For example, the electronic device 101 may provide information associated with the measured intensity of the signal to the audio processing circuit 205. In case that the measured intensity of the signal is less than or equal to a reference value, the electronic device 101 may perform pre-processing 731 on the second audio data by using a buffer (e.g., the buffer 611-1, 612-1). For example, in case that the measured intensity of the signal is less than or equal to the reference value, the electronic device 101 may determine that the sound volume of the first audio data is decreased or a latency occurs. Based on the information associated with the measured signal, the audio processing circuit 205 may apply a parameter related to a gain or a latency to the first audio data, so as to perform pre-processing 731.

According to an embodiment, the electronic device 101 may perform post-processing 733 on a single audio stream produced using the first audio data including N audio channels and the second audio data including X audio channels. The electronic device 101 may provide the single audio stream to the audio HAL 403 via a PCM node 720. The single audio stream may include N+X channels, and may be processed as a single input. The post-processing 733 may be performing of at least one of noise cancellation or sound quality correction.

According to an embodiment, the electronic device 101 may include a plurality of microphones, the main processing circuit 203, and the audio processing circuit 205. The main processing circuit 203 may be configured to obtain, via the plurality of microphones, first audio data including a plurality of audio channels, to receive second audio data including at least one audio channel from an external device connected to the electronic device 101, and to provide the first audio data and the second audio data to the audio processing circuit 205. The audio processing circuit 205 may be configured to produce a single audio stream having a predetermined number of audio channels by using the plurality of audio channels of the first audio data and the at least one audio channel of the second audio data, and to provide the single audio stream to the main processing circuit 203.

According to an embodiment, the electronic device 101 may include a wireless communication circuit that supports short-range wireless communication. The main processing circuit 203 may receive the second audio data from the external device via the wireless communication circuit.

According to an embodiment, the wireless communication may include Bluetooth communication.

According to an embodiment, the electronic device 101 may include a wired interface. The main processing circuit 203 may be configured to connect to the external device in a wired manner via the wired interface, and to receive the second audio data from the external device.

According to an embodiment, the external device may include wired earphones or wireless earphones.

According to an embodiment, the main processing circuit 203 may include the audio processing circuit 205 as a first processing block, and the audio processing circuit 205 may provide the single audio stream to a second processing block of the main processing circuit 203.

According to an embodiment, the electronic device 101 may include a plurality of buffers corresponding to the plurality of audio channels of the first audio data and at least one buffer corresponding to the at least one audio channel of the second audio data.

According to an embodiment, the main processing circuit 203 may be configured to measure an intensity of a signal corresponding to the second audio data received from the external device connected to the electronic device 101, and to provide information corresponding to the measured intensity of the signal to the audio processing circuit.

According to an embodiment, the audio processing circuit 205 may be configured to perform pre-processing on the second audio data by a buffer in case that the measured intensity of the signal is less than or equal to a reference value.

According to an embodiment, the pre-processing may include converting the second audio data based on a parameter related to a gain or a latency.

According to an embodiment, the audio processing circuit 205 may be configured to combine the plurality of audio channels of the first audio data and the at least one audio channel of the second audio data, and to produce the single audio stream based on the combination.

According to an embodiment, the audio processing circuit 205 may be configured to combine the plurality of audio channels of the first audio data and the at least one audio channel of the second audio data that is converted via pre-processing, and to produce the single audio stream based on the combination.

According to an embodiment, the audio processing circuit 205 may be configured to combine, based on at least one of the number of the designated number of audio channels or a sampling rate, the plurality of audio channels of the first audio data and the at least one audio channel of the second audio data, and to produce the single audio stream based on the combination.

According to an embodiment, the audio processing circuit 205 may be configured to perform post-processing on the produced single audio stream.

According to an embodiment, the post-processing may include noise cancellation or sound quality correction.

According to an embodiment, an operation method of the electronic device 101 may include an operation of obtaining, via a plurality of microphones, first audio data including a plurality of audio channels, an operation of receiving second audio data including at least one audio channel from an external device connected to the electronic device 101, an operation of providing the first audio data and the second audio data to an audio processing circuit, an operation of producing a single audio stream having a designated number of audio channels by using the plurality of audio channels of the first audio data and the at least one audio channel of the second audio data via the audio processing circuit, and an operation of providing a main processing circuit to the single audio stream.

According to an embodiment, the operation method of the electronic device 101 may include an operation of measuring an intensity of a signal corresponding to the second audio data received from the external device connected to the electronic device 101, and an operation of providing information corresponding to the measured intensity of the signal to the audio processing circuit 205.

According to an embodiment, the operation method of the electronic device 101 may include an operation of performing pre-processing on the second audio data by using a buffer in case that the measured intensity of the signal is less than or equal to a reference value.

According to an embodiment, the operation method of the electronic device 101 may include an operation of combining the plurality of audio channels of the first audio data and the at least one audio channel of the second audio data, and an operation of producing the single audio stream based on the combination.

According to an embodiment, the operation method of the electronic device 101 may include an operation of performing post-processing on the produced signal audio stream, the post-processing including noise cancellation or sound quality correction.

In detailed embodiments of the disclosure, component elements included in the disclosure may be expressed as a single entity or multiple entities depending on a detailed embodiment. However, the expression of a single entity or multiple entities is selected to be appropriate for the given situation for ease of description. The disclosure may not be limited to a single component or multiple component elements, and a component element expressed as multiple entities may be configured as a single entity and a component element expressed as a single entity may be configured as multiple entities.

Although embodiments of the disclosure have been described and shown, various modifications may be made within the scope of the disclosure. Therefore, the scope of the disclosure should not be limited to the above-described embodiments, and should be defined by the scope of claims set forth below and the equivalents thereto.

What is claimed is:

1. An electronic device comprising:
at least one microphone;
an audio processing circuit,
a main processing circuit operatively connected to the at least one microphone and the audio processing circuit,
wherein the main processing circuit is configured to:
obtain, via the at least one microphone, first audio data comprising a first number of audio channels, the first number being greater than or equal to one;
receive second audio data comprising a second number of audio channels from an external device connected to the electronic device, the second number being greater than or equal to one;
provide the first audio data and the second audio data to the audio processing circuit;
measure an intensity of a signal corresponding to the second audio data received from the external device connected to the electronic device; and
provide information corresponding to the measured intensity of the signal to the audio processing circuit, and
wherein the audio processing circuit is configured to:
based on the information corresponding to the measured intensity of the signal indicating that that the measured intensity of the signal is less than or equal to a reference value, perform a pre-processing on the second audio data, wherein the pre-processing comprises converting the second audio data based on a parameter related to a gain or a latency;
produce a single audio stream comprising a third number of audio channels by using the first number of audio channels of the first audio data and the second number of audio channels of the second audio data; and
provide the single audio stream to the main processing circuit.

2. The electronic device of claim 1, further comprising a wireless communication circuit configured to support short-range wireless communication, wherein the main processing circuit is further configured to receive the second audio data from the external device via the wireless communication circuit.

3. The electronic device of claim 2, wherein the short-range wireless communication is Bluetooth communication.

4. The electronic device of claim 1, further comprising a wired interface, wherein the main processing circuit is further configured to:

connect to the external device in a wired manner via the wired interface; and receive the second audio data from the external device.

5. The electronic device of claim 1, wherein the external device comprises wired earphones or wireless earphones.

6. The electronic device of claim 1, wherein the main processing circuit comprises the audio processing circuit as a first processing block, and wherein the audio processing circuit is further configured to provide the single audio stream to a second processing block of the main processing circuit.

7. The electronic device of claim 1, further comprising (i) a first number of buffers corresponding to the first number of audio channels of the first audio data and (ii) a second number of buffers corresponding to the second number of audio channels of the second audio data.

8. The electronic device of claim 1, wherein the audio processing circuit is further configured to produce the single audio stream by combining the first number of audio channels of the first audio data and the second number of audio channels of the second audio data.

9. The electronic device of claim 1, wherein the audio processing circuit is further configured to produce the single audio stream by combining the first number of audio channels of the first audio data and the second number of audio channels of the second audio data that is converted via the pre-processing.

10. The electronic device of claim 1, wherein the audio processing circuit is further configured to produce the single audio stream by combining, based on at least one of (i) the third number of audio channels or a sampling rate, (ii) the first number of audio channels of the first audio data, and (iii) the second number of audio channels of the second audio data.

11. The electronic device of claim 1, wherein the audio processing circuit is further configured to perform post-processing on the produced single audio stream.

12. The electronic device of claim 11, wherein the post-processing comprises noise cancellation or sound quality correction.

13. An operation method performed by an electronic device, the operation method comprising:

obtaining, via at least one microphone of the electronic device, first audio data comprising a first number of audio channels, the first number being greater than or equal to one;

receiving second audio data comprising a second number of audio channels from an external device connected to the electronic device, the second number being greater than or equal to one;

providing the first audio data and the second audio data to an audio processing circuit of the electronic device;

measuring an intensity of a signal corresponding to the second audio data received from the external device connected to the electronic device;

providing information corresponding to the measured intensity of the signal to the audio processing circuit;

based on the information corresponding to the measured intensity of the signal indicating that that the measured intensity of the signal is less than or equal to a reference value, performing a pre-processing on the second audio data, wherein the pre-processing comprises converting the second audio data based on a parameter related to a gain or a latency;

producing a single audio stream having a third number of audio channels by using the first number of audio channels of the first audio data and the second number of audio channels of the second audio data via the audio processing circuit; and providing the single audio stream to a main processing circuit.

14. The operation method of claim 13, further comprising producing the single audio stream by combining the first number of audio channels of the first audio data and the second number of audio channels of the second audio data.

15. The operation method of claim 13, further comprising performing post-processing on the produced signal audio stream, wherein the post-processing comprises noise cancellation or sound quality correction.

* * * * *